Fig. 3.

INVENTORS:
Peter John Harris
Richard John Wingrove
Michael John Billington

BY Spencer & Kaye
Attorneys

United States Patent Office 3,519,068
Patented July 7, 1970

3,519,068
HEAT EXCHANGER ASSEMBLIES
Peter John Harris, Birmingham, Michael John Billington, Upper Longdon, and Richard John Wingrove, Lichfield, England, assignors to Birwelco Limited, Birmingham, England, a British company
Filed Feb. 8, 1968, Ser. No. 703,941
Claims priority, application Great Britain, Feb. 8, 1967, 6,006/67, 6,007/67
Int. Cl. F28f 9/00
U.S. Cl. 165—68                     17 Claims

ABSTRACT OF THE DISCLOSURE

The specification discloses a heat exchanger assembly in the form of a natural draught cooling tower for cooling e.g. condensate from steam turbines, and comprising horizontal A frames within the tower through which the liquid to be cooled is passed, the A frames being at two levels, those in the centre of the tower being below those formed in a ring about the central frames. The specification also discloses pipework for filling and draining the A frames.

BACKGROUND OF THE INVENTION

Field of the invention

At present, there are two main types of natural draught cooling towers. The first is the so-called "wet" tower in which water passes downwardly through the tower in direct heat exchange with air. The second type, with which in the invention is concerned, is the so-called "dry" cooling tower in which water is passed through heat exchanger elements in indirect heat exchange with air.

Description of the prior art

It has previously been proposed to have a dry cooling tower in which a plurality of elements comprising vertically arranged, finned tubes are arranged around the periphery of the base of a tower, each element being rectangular in plan and the elements being arranged in a zigzag configuration around the base of the tower when viewed in plan.

With this known type of dry cooling tower, under windy conditions, the tower decelerates the air flow at the front of the tower, considered in the direction of the wind, and there are increased air flow velocities at the sides of the tower, again considered in the direction of the wind. Since the total pressure of the air stream remains constant then, neglecting friction, the total pressure is equal to the sum of the static and dynamic pressures of the air flow. It follows that the greater the dynamic pressure the less is the static pressure. Due to the deceleration at the front of the tower, therefore, there will be an increased static pressure since there will be less dynamic pressure and at the sides of the tower there will be an increased dynamic pressure and a lesser static pressure. Since the air flow through the elements depends on the static pressure. Since the air flow through the elements depends on the static pressure, there will be a variation in static pressure around the periphery of the tower and therefore there will be nonuniform flow over the elements which is undesirable. At the sides of the tower, the dynamic pressure at the outlet of the windward of two adjacent elements is such that it will reduce or even reverse the inward flow of air through the leeward element of the pair. This effect is aggravated by the high air flow velocities at the sides of the tower.

It is an object of the present invention to provide a natural draught dry cooling tower in which the adverse effect of the wind as compared with known towers is reduced.

SUMMARY OF THE INVENTION

According to the invention, we provide a natural draught cooling tower comprising a vertical tower; peripherally extending support means between the lower end of the tower and the ground so that said lower end is spaced above the ground; a heat exchanger assembly located within the support means and comprising a plurality of heat exchanger elements, each element comprising a multiplicity of substantially horizontal, finned tubes arranged in A-frames, the A-frames of each element being parallel and at the same level, each A-frame comprising two banks of tubes which are mutually inclined in the form of an inverted V and both inclined to a vertical plane bi-secting the angle between them, said elements covering a major portion of the area within the support means and being arranged on at least two levels, the central element or elements nearest to the centre of said area being spaced above the ground at a relatively lower level and being surrounded by at least one ring of outer elements spaced above the ground at a relatively higher level, and sealing means between the tower and the upper or uppermost ring of elements and between the elements at different levels so as substantially to prevent air entering said area from entering the tower without passing through one of said elements.

We have found that by arranging the finned tubes horizontally, rather than vertically, various advantages arise and by arranging the elements at different levels, a very good performance can be obtained under both still air and windy conditions.

By arranging the tubes horizontally, the air all over the tower base is heated approximately uniformly and thus avoids the occurrence of a cool air core recirculating air downwards which may occur in a dry cooling tower using a vertical tube arrangement. Such recirculation reduces the effective draught of the tower.

Secondly, the substantial horizontal tubes are self-compensating in avoiding air flow maldistribution. This is because any drop in air flow through a given area of tubes will increase the temperature of the air immediately above the area and hence increase the available draught in their region. Conversely, any increased air flow over an area of the tubes will lower the air temperature over that area thus reducing the air velocity.

By arranging the elements at two levels we have found that under windy conditions the resistance to cross-flow under the elements is increased. The general velocity of flow under the heat exchanger assembly is thus reduced so that the dynamic pressure is held at a comparatively low value whereby sufficient static pressure is generated to drive the air efficiently through the tubes.

In still air conditions, the transverse air velocity across the underside of the heat exchanger assembly tends to zero at the centre of the area so that the static pressure increases from the periphery of the tower towards the centre. If all elements are at one level this can lead to enhanced flow to the central elements. The resistance to air flow provided by the central elements at the relatively lower level causes a reduction of total pressure and also increases the transverse air velocity at a point between the peripheries of the tower and the centre thereof thus reducing the static pressure at this point and tending to maintain a more uniform static pressure over the whole of the underside of the heat exchanger assembly than would be the case if all the elements were at the same level. With a tendency towards uniformity of static pressure there will also be a tendency towards uniformity of air flow, and thus of heat exchange performance.

All of these effects mentioned above will act together to equalise the air flow over the whole of the heat exchanger assembly in contrast to the previously known arrangement in which vertical tubes are used and which suffers from maldistribution as described above.

Where we refer to the tubes as being "substantially horizontal" we mean that the tubes make an angle of no more than 5° with the horizontal.

Preferably, the adjacent lower edges of adjacent banks of adjacent A-frames in each element are supported by, and located above, a beam of a supporting framework. We have found that the presence of these beams, especially if they are made comparatively deep, assists in preventing air flow through the windward bank of an adjacent pair of banks tending to reverse the air flow through the leeward bank of said pair.

Preferably, each bank comprises a plurality of tubes arranged between opposed headers and the ring of elements immediately surrounding the central element or elements is in the form of a square, the A-frames of the elements on two opposite sides of the square being parallel to the A-frames of the central element or elements so that the headers of the inner ends of the A-frames on said two opposite sides overlap the headers at the ends of the central element or elements. By this arrangement, a compact structure is obtained and also it is possible easily to gain access to the headers for maintainance purposes.

There may be two central elements at said lower level and the A-frames of said central elements will be parallel to one another. In this case there may be a platform between the inner ends of said central A-frames and a closable aperture in said platform. The aperture is preferably arranged to enable tubes to be passed therethrough as a step in the erection of the cooling tower as will be described below. One of the problems in dry cooling towers is the necessity, from time to time, to drain the elements if the power station is on light load or if the air temperature should be decreased below a certain value which would introduce the risk of freezing of the water in the elements. Moreover, if the tubes are made of material which is subject to corrosion, when the tubes are drained there is a danger of corrosion.

It is a feature of the invention to provide means whereby this risk of corrosion is reduced. Thus there may be provided a sump to receive liquid from the elements, first conduit means extending between a relatively lower portion on each element and a relatively lower part of the sump to permit passage of liquid between an element and the sump, first valve means in each first conduit means and second conduit means extending between a relatively higher position on each element and a relatively higher part of the sump, the second conduit means and at least the upper part of the sump containing an inert gas; passage of liquid along the first conduit means from the sump or an element displacing inert gas along the second conduit means from the element or the sump to fill the space left in the sump or the element by the displaced liquid.

Preferably, the sump is below the element so that liquid can drain from the elements into the sump by gravity, pump means being provided to pass liquid from the sump to each element.

There may be a source of inert gas connected to said relatively higher part of the sump through a pressure-regulating valve to hold the pressure in said sump at a value above atmospheric. Preferably the inert gas is nitrogen which is readily available and is effective for this purpose.

The invention also provides a convenient arrangement for leading liquid to and from the elements. There may therefore be provided an inlet main and an outlet main connected to each element through third and fourth conduit means respectively, fifth conduit means for connecting said means to the sump and isolating valves in said third, fourth and fifth conduits. It may often be required to drain the elements, as described above, but the amount of liquid contained in the elements is only about 20% of the total liquid in the system. Since the liquid must be protected against silica pick up, it is normal to provide a concrete sump and to coat this with some preparation which prevents silica pick up. The remaining pipe work including the mains has only to be drained in emergency or for maintenance purposes and therefore if the sump was of sufficient capacity to receive all the liquids in the system it would very rarely be filled. A further feature of the invention, therefore, provides a second sump connected to the first-mentioned, the first-mentioned sump being of a capacity to receive all the liquid from said elements, said first conduit means and those parts of the third and fourth conduit means between the isolating valves and the elements but of a capacity insufficient to receive all the liquid from the elements, the first, third and fourth conduit means and said mains, the second sump being connected to receive the liquid which cannot be contained in the first mentioned sump when said mains and the third and fourth conduit means are drained.

As mentioned above, the first-mentioned sump may be made of concrete and may be coated with a lining to prevent or reduce silica pick up. The first-mentioned sump may be within the support means, i.e. within the base of the tower while the second sump may be located outside the tower.

To assist in drainage of the elements, there may be provided a ring main connected to all of said first conduit means between the first-mentioned sump and the valve means, the ring main being connected to said sump through second valve means and means for drawing liquid from said sump and delivering it to the ring main through third valve means.

According to a further aspect of the invention we provide a method of erecting a natural draught tower according to the previously described aspect of the invention comprising erecting a supporting framework for the heat exchanger assembly, securing headers to such framework at the locations to be occupied by the ends of the banks of tubes, inserting the ends of the tubes in the headers and then securing said ends in the headers.

By following this method, it is not necessary to prefabricate the banks of tubes before assembly and thus it is not necessary to provide a heavy lifting equipment to lift the prefabricated banks into position in the tower and thus the permanent structure required is reduced.

BRIEF DESCRIPTION OF THE DRAWING

An embodiment of the invention will now be described in detail by way of example with reference to the accompanying drawings in which.

DESCRIPTION OF THE PREFERRED EMBODIMENT

Figure 1:
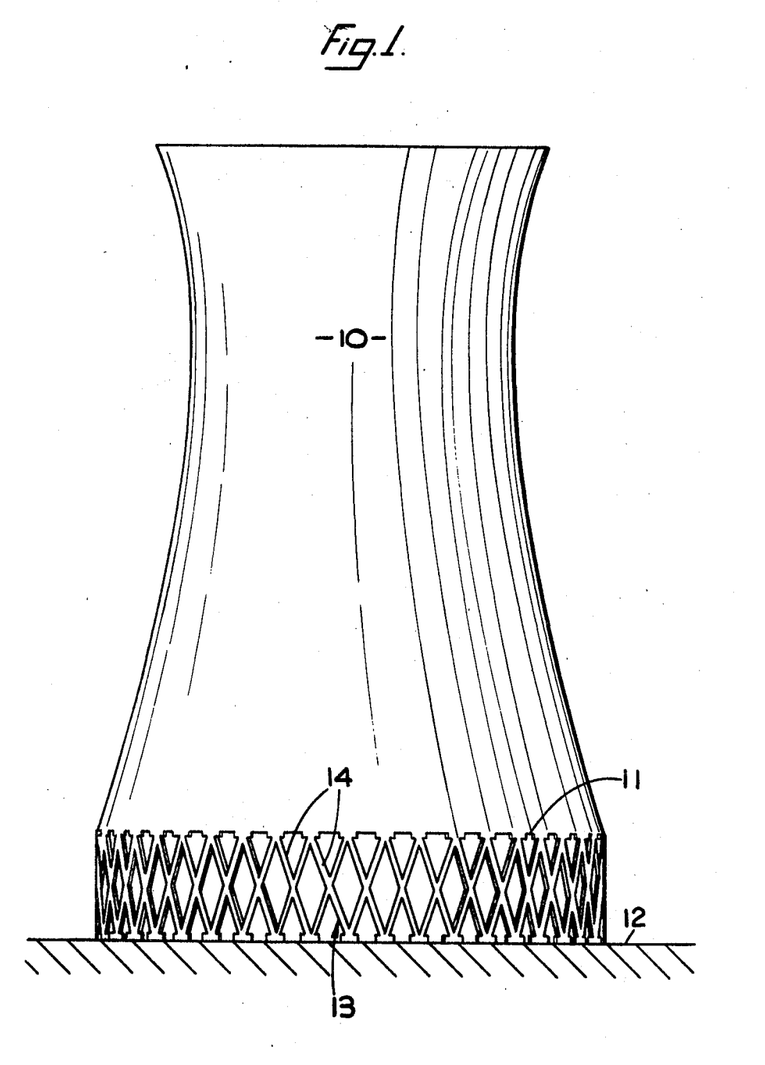
FIG. 1 is a side elevation of a natural draught cooling tower embodying the invention.
Figure 2:
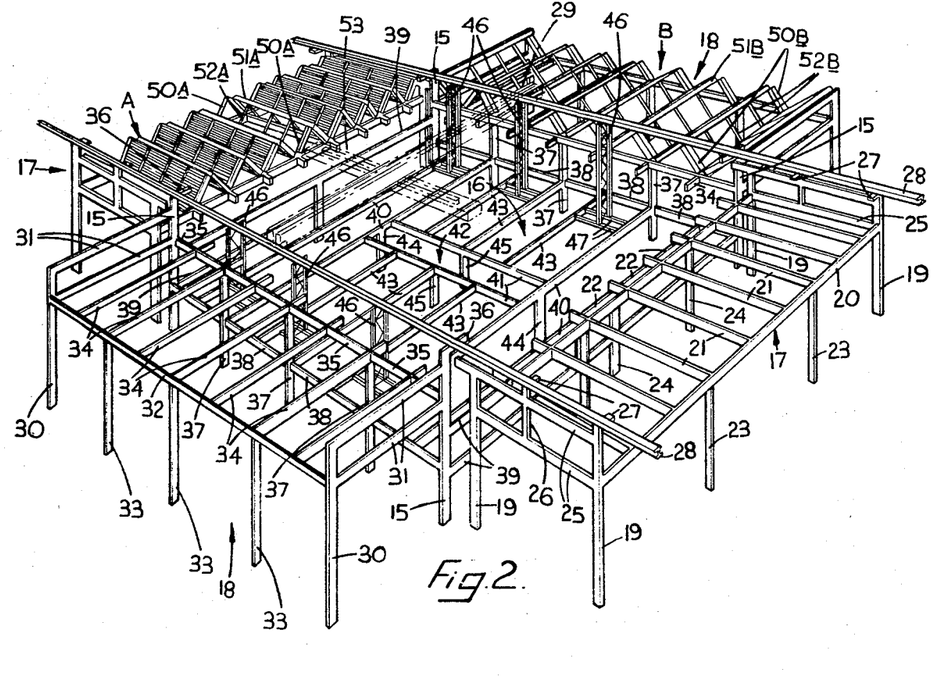
FIG. 2 is a perspective view of the supporting framework for a heat exchanger assembly showing the latter partly assembled thereon.
Figure 3:
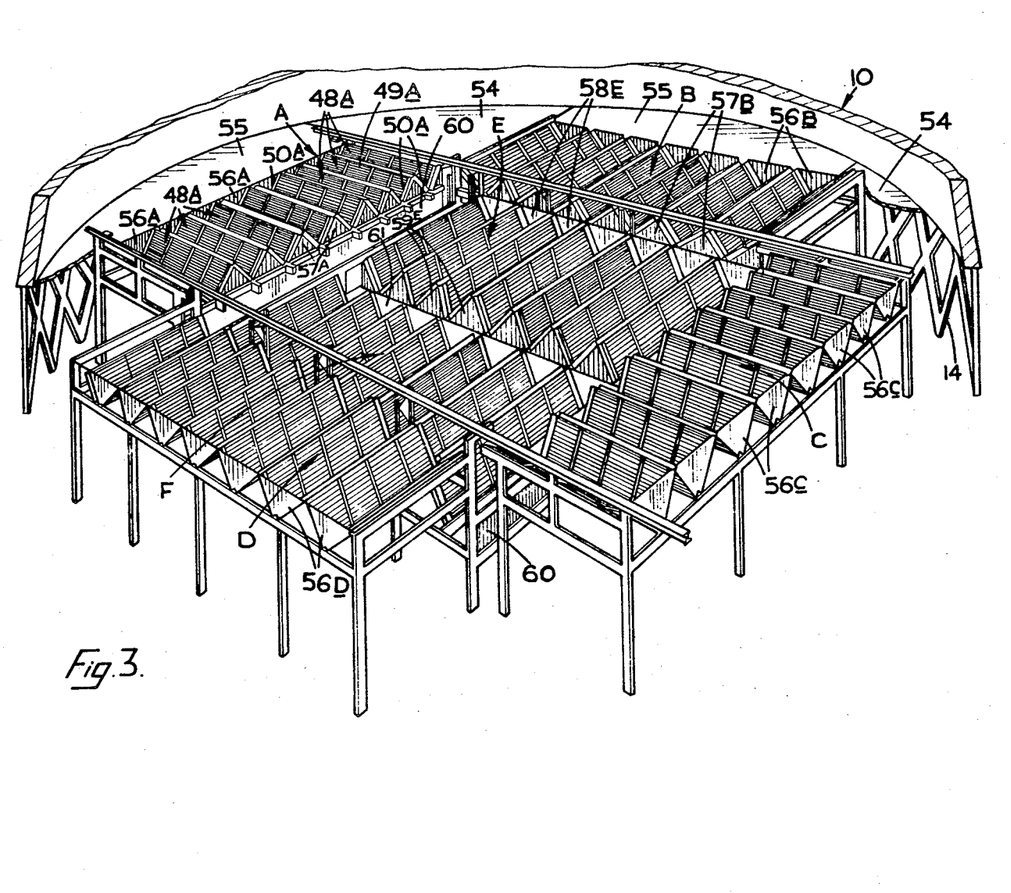
FIG. 3 is a perspective view similar to FIG. 2 but showing the heat exchanger assembly complete on its supporting framework and showing the location of the tower which is partly broken away.
Figure 4:
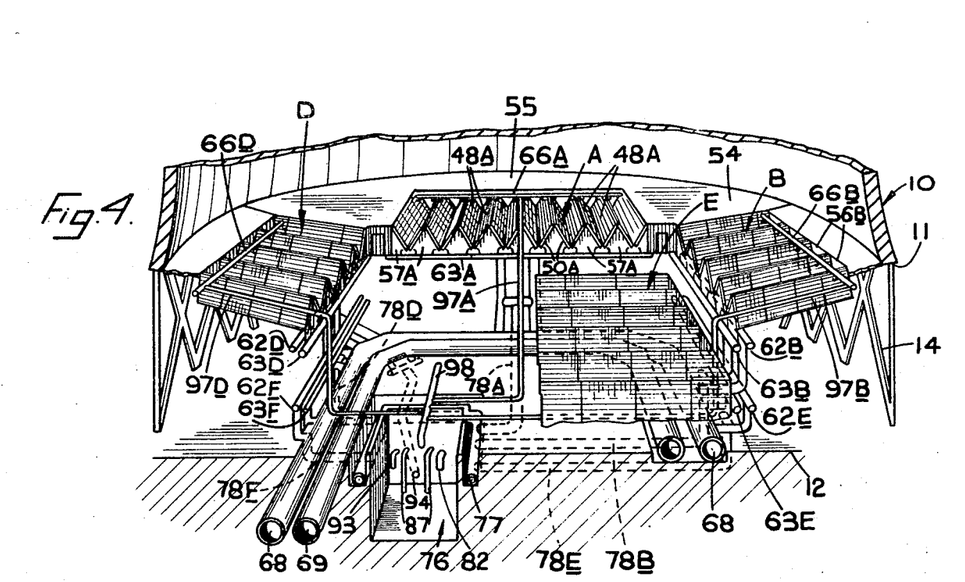
FIG. 4 is a perspective view of the heat exchanger assembly, part of which is omitted, showing some of the pipe work therefor.
Figure 5:
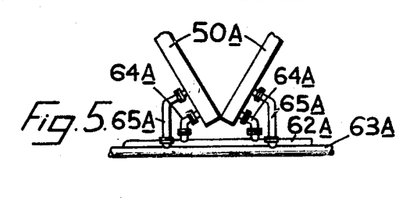
FIG. 5 is a retail end elevation showing the connection of the headers of the A-frames to the inlet and outlet manifolds.

Referring first to FIGS. 1 to 3, the construction and erection of the heat exchanger assembly will first be described. It is to be noted that in FIGS. 2 and 3 none of the pipe work has been shown, this having been omitted for clarity and being described in relation to FIGS. 4 to 9.

The natural draught cooling tower assembly comprises a tower proper indicated at 10 which is of generally hyperbolic form although, if desired, it could be of any other form such as ellipsoidal. The lower end 11 of the tower is spaced above the ground 12 by means of peripherally extending support means 13 which comprise a plurality of cruciform struts 14. The support means extend around the whole of the periphery of the tower.

Located within the support means 13 is a heat exchanger assembly which comprises a reinforced concrete framework which is best shown in FIG. 2. The supporting framework comprises four uprights 15 arranged at the corners of a square. The uprights define between them a central portion of the framework which is indicated generally at 16 and there are four outer portions arranged on the four sides of the square defined by the uprights 15, the outer portions 17 on two of the opposite sides being identical and the outer portions 18 on the other two opposite sides being identical.

Considering first one of the outer portions 17, this comprises four uprights 19 at the corners of a rectangle, the two outer uprights being connected by a beam 20 which supports a number of transverse beams indicated at 21, the transverse beams having interposed between them adjacent their ends remote from the beam 20, further beams some of which are indicated at 22. The beam 20 is supported by two further uprights 23 and the assembly of transverse beams 21 and beams 22 supported by further two uprights 24.

Each pair of uprights 19 at each of the shorter ends of the rectangle are connected by two transverse beams 25, the mid points of which are joined by an upright 26. Each upright 26 and the outermost upright 19 is provided with a cantilever 27 and on these cantilevers rest a pair of rails 28 on which runs a beam crane indicated in chain dotted lines at 29.

Each outer portion 18 is of a construction which is similar to the outer portion 17 and includes, in addition to the two uprights 15, two further uprights 30 at the other corners of the rectangle, each upright 30 being connected to the upright 15 by two transverse beams 31 and the uprights 30 being connected by a beam 32 which in turn is supported by three uprights 33. The beam 32 supports a plurality of transverse beams 34 whose ends are spaced and interconnected by beams 35 the end ones of which are connected to the uprights 15. The uprights 15 have cantilevers 36 on which the rails 28 and the assembly of transverse beams 34 and beams 35 are supported by further uprights 37 similar to the uprights 24. The uprights 37 are connected by horizontal beams 38.

Turning now to the central portion of the framework, on the sides of the square formed by the central portion which are abutted by the outer portion 17, each pair of uprights 15 is connected by two spaced horizontal beams 39. Parallel to the beams 39 there are four further horizontal beams 40 which extend between the beams 38 on the sides of the square abutted by the outer portions 18. Between the two inner horizontal beams 40 are two spaced transverse beams 41 which define, with the inner beams 40, an opening 42. Extending between the beams 38 and each transverse beam 42 are three further horizontal beams 43 and there are uprights 44 at the ends of the opening 42 and further uprights 45 at the centres of the two longer sides thereof.

The rails 28 are supported by six lattice-work stanchions 46, each lattice-work stanchion being supported between two horizontal beams, either between a beam 40 and a beam 43 or between two beams 43 by means of a pair of transverse beams, one pair of which is indicated at 47.

It will be noted that the transverse beams 21 of the outer portions 17 and transverse beams 34 of the outer portions 18 are at substantially the same level. The transverse beams 21 and 34 slope downwardly at an angle of about 2° from the beams 20 and 32 respectively towards the beams 22 and 35 respectively. The transverse beams 21 and 34 are at a level which is above the beams 40, 41 and 43. As will now be described, the outer portions 17 and 18 support four heat exchanger elements at a relatively higher level with respect to the ground 12 while the central portion supports two heat exchanger elements at a relatively lower level to the ground 12.

The six heat exchanger elements are shown in FIG. 3 and are designated by the letters A, B, C, D, E and F. Each of the heat exchanger elements is similar and each comprises a multiplicity of finned, substantially horizontal tubes, arranged in A-frames. Referring, for example, to the element A, there are seven A-frames, some of which are indicated at 48A, which are arranged adjacent to one another and parallel to one another. Each A-frame 48A comprises two banks of tubes, one of which is indicated at 49A and each bank comprises a plurality of generally horizontal tubes which have their ends received in headers some of which are indicated at 50A. It will be seen that the A-frames of the sections A and C are parallel and at the same level and that the A-frames of the sections B, D, E and F are parallel with the A-frames of the sections B and D at the same level and the A-frames of the sections E and F at a lower level.

Referring to FIG. 2, each element is erected on the supporting framework as will now be described in relation to the elements A and B shown in FIG. 2. Referring first to the element B, the headers 50B are first placed in position on the beams 32 and 35 and each pair of headers 50B is joined by a transverse member 51B. Extending between the transverse member 51B and one of the transverse beams 34 at spaced intervals are supporting members 52B so that the headers 50, transverse members 51 and supporting members 52 provide a plurality of generally triangular frameworks as shown for the section B in FIG. 2.

Referring now to the section A in FIG. 2, one of these frameworks is shown as untubed with its headers 50, transverse members 51A and supporting members 52A and a box 53 containing tubes to be inserted in the headers 50A is indicated as supported by the crane 29. The box is moved into a valley between two upwardly diverging sets of supporting members 52 and the tubes are taken out of the box and are manually flexed and their ends inserted in the headers 50A. After the tube ends have been inserted into the headers, the ends of the tubes are expanded and thus the tubes are fixed in the headers. Workmen may build up temporary platforms between each A-frame as the tubing continues so as to have access to the headers. The element A is shown with all its A-frames completely tubed except for the A-frame referred to.

Each element is tubed in the manner described above, the box 53 being lifted through the opening 42 by the crane and then swung and manoeuvred into the desired position by means of bogies, not shown, which run on the crane 29.

It will be seen that the adjacent lower ends of adjacent banks of tubes rest upon beams. Thus the adjacent lower ends of adjacent banks of tubes in the outer sections 18 rest on the transverse beams 34. Similarly, the adjacent lower ends of adjacent banks of tubes in the outer section 17 rest on the transverse beams 21. In the central portion of the assembly, the adjacent lower ends of the adjacent banks of tubes rest on the beams 43. The beams 21, 34 and 43 are made comparatively deep so as to minimise the possibility of air blowing through the windward bank of an adjacent pair of banks and then through the leeward bank of the pair to reduce or reverse the flow through said leeward bank.

In operation of the cooling tower, air flows into the base of the tower through the cruciform struts 14 and into the space between the undersides of the elements and the ground. The air then flows upwardly through the elements to cool water flowing through the tubes thereof. Sealing means are provided so as to ensure that substantially all the air which enters the area underneath the heat exchanger assembly flows upwardly through one or more of the elements and is prevented from flowing around the sides of the elements. Thus, sealing plates 54 of segment shape fill the spaces between the internal surface of the tower 10 annd the adjacent ends of the elements A and B; B and C; C and D and D and A. Further sealing plates 55 fill the spaces between the outer edge of each of the elements A, B, C and D and the inner surface of the tower 10.

For each of the elements A, B, C and D, there are sealing plates 56 indicated at 56A for the element A, 56B for the element B, 56C for the element C and 56D for the element D which close the valleys between adjacent A-frames at the outer ends of the valleys. These sealing plates 56 cooperate with the sealing plates 54 and 55. At the inner end of each of the elements A, B, C and D there are sealing plates 57 shown clearly for the elements A and B at 57A and 57B respectively which close the inner ends of the A-frames. There are sealing plates 58 at the outer ends of the elements E and F, only those plates for the element E being visible in FIG. 3 and being indicated at 58E. Similarly the inner ends of the A-frames of the elements E and F have sealing plates 59 of which only the sealing plates 59E of the element E are visible. There is a sealing plate 60 between the inner ends of the elements A and C and the sides of the elements A and C and the sides of the elements E and F. It will be seen that by the provision of all the sealing plates mentioned above, air entering the underside of the heat exchanger assembly will have to pass through one of the elements if it is to flow upwardly. The opening 42 is closed by a removable floor 61 so as to prevent air flow up through the opening during normal operation of the cooling tower assembly but which can be removed to give passage to the box 53 when required for maintainence purposes once the cooling tower assembly has been erected.

Figure 6:
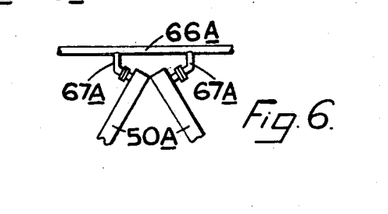
FIG. 6 is a view similar to FIG. 5 showing the connection of the headers of the A-frames to a nitrogen manifold.

As has been mentioned above, none of the pipe work to the elements is shown in FIGS. 2 and 3, such pipe work being shown in FIGS. 4 to 9 with reference to which it will now be described. Since the pipe work for each of the elements is similar, the pipe work for the element A will be described by way of example, each part thereof having the suffix A and similar parts of the pipe work for the other elements will be indicated by the same numbers with the appropriate element suffix letter. Thus referring particularly to FIGS. 4, 5 and 6, the headers 50A at the inner ends of the A-frames 48A are connected to an inlet manifold 62A and an outlet manifold 63A by connecting pipes 64A and 65A respectively. The headers 50A at the outer ends of the A-frames 48A are connected to a nitrogen manifold 66A by means of connecting pipes 67A as shown in FIG. 6.

Figures 7, 9:
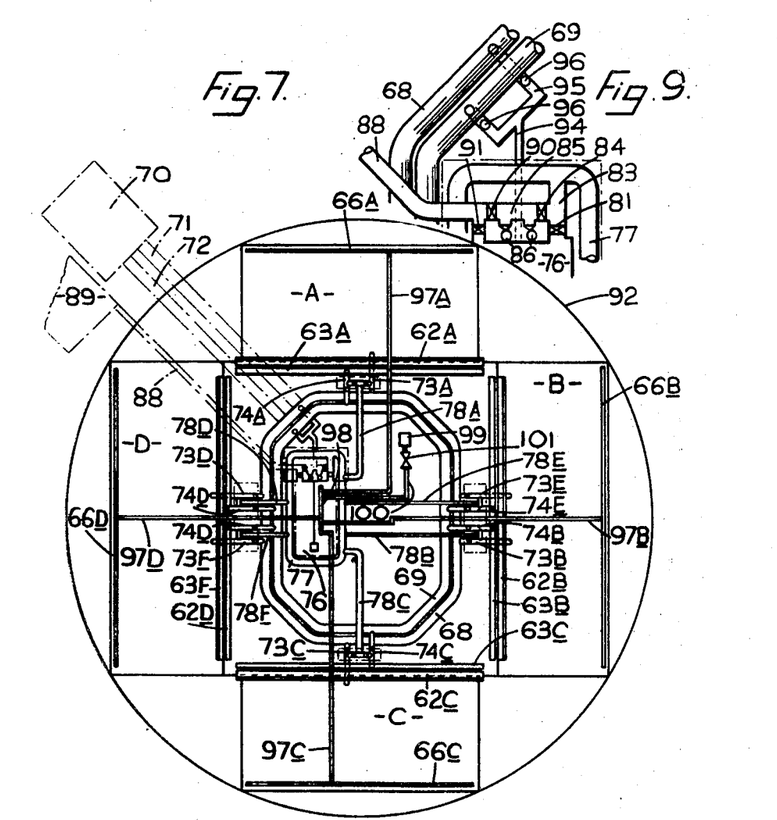
FIG. 7 is a diagrammatic plan view showing the pipe work for the heat exchanger assembly.
FIG. 9 is a detail of FIG. 7 on a larger scale showing the pipe work connections to the sump.
Figure 8:
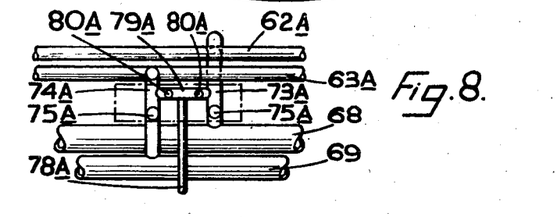
FIG. 8 is a detail view of the pipe work of FIG. 7 on a larger scale.

There is an inlet main 68 serving all the elements and an outlet main 69 and these mains are connected to a generating plant indicated generally at 70 in FIG. 7 by an inlet pipe 71 and an outlet pipe 72 respectively. Referring to FIG. 8, extending between the inlet main 68 and the inlet manifolds 62A is an inlet feeder 73A and extending between the outlet main 69 and the outlet manifold 63A is an outlet feeder 74A these feeders contain isolating valves 75A.

A sump indicated generally at 76 is provided and is associated with a drain ring main 77 which is connected to each of the elements. Thus the ring main 77 is connected to the element A by means of a pipe 78A which terminates in a T-piece 79A which connects with the feeders 73A and 74A and which contains valves 80A.

Each of the elements B to F inclusive is connected to the inlet and outlet mains 68 and 69 and to the ring main 77 in a similar manner.

Referring particularly to FIG. 9, the ring main 77 is connected to the sump 76 by means of a main dump valve 81 which communicates with the lower part of the sump by means of a spout 82, the valve 81 being connected to the main 77 by a feeder 83. There is also provided a main filling valve 84 in a pipe 85 which communicates with the sump 76 through pumps 86, the pumps drawing from the bottom of the sump through spouts 87. A pipe 88 connects the sump 76 with a second sump 89 and this pipe 88 communicates with the pipe 85 through a filling valve 90 and with the sump 76 through a high level dump valve 91. The sump 79 is outside the periphery of the tower which is indicated by a line 92 and is at a higher level than the sump 76. The high level dump valve 91 communicates with a lower part of the sump 76 through a spout 93.

The inlet and outlet mains 68 and 69 are connected to the sump 76 by means of a pipe 94 which opens into the bottom of the sump as indicated in FIG. 6 and has at one end a T-piece 95, the arms of which are connected to the inlet and outlet mains through drain valves 96.

Each of the nitrogen manifolds 66 of the sections is connected by means of a pipe 97 to a common pipe 98. The nitrogen manifolds for the sections E and F have been omitted but these are similarly connected to the common pipe 98. The common pipe 98 is connected to a source 99 of nitrogen under pressure through a pipe 100 and a pressure regulating valve 101.

The operation of the cooling tower assembly will now be described. Assuming that the generating station 70 is on full load, condensate from a jet condenser in which the waste steam from the turbines is condensed will pass along the inlet pipe 71 to the inlet main 68 and from the inlet main through each of the inlet feeders 73 to the elements and from the elements along the outlet feeders 74 to the outlet main 69 and from thence back to the generating station along the outlet pipe 72.

Air will be heated by the condensate flowing through the finned tubes of the elements and will thus create a natural draught. The air will enter through the cruciform struts 14 into the space beneath the heat exchanger assembly and due to the various sealing plates described in detail above, the air will have to flow through one of the elements to escape upwardly of the tower. As explained in detail above, due to the fact that the elements E and F are below the other elements A to D, the velocity of cross flow under the heat exchanger element under windy conditions is reduced compared with what it would be if all the elements were on the same level so that the static pressure beneath the heat exchanger assembly is maintained at a desirable value to cause the air to flow upwardly through the heat exchanger elements. Furthermore, as the air flows inwardly, when it encounters the sealing plates 60 or 58, it will be deflected downwardly and the velocity will be increased at this point thus increasing the dynamic pressure and decreasing the static pressure so as to give a more uniform distribution of static pressure over the underside of the heat exchanger assembly as described in detail above.

If it is desired to drain one or more of the elements A to F then the following procedure is adopted as will be described in relation to the element A. The isolating valves 75A are closed and the valves 80A are opened so that the water in the element A will drain along the pipe 78A to the ring main 77. The main dump valve 81 will be open and the water will enter the lower part of the sump 76. The upper part of the sump is filled with nitrogen from the source 99 and this nitrogen also fills the pipes 97 and the nitrogen manifolds 66. As water flows into the sump 76 it will displace nitrogen which will flow out along the common pipe 98 and the pipe 97A to fill the space in the element A left by the draining of the water. Any of the other elements is drained in a similar manner.

If it is now desired to refill a drained element, for example the element A, the isolating valves 75A are retained closed and the main dump valve 84 is closed and the pumps 86 are operated to pump water from the sump into the ring main 77 and then along the pipe 78A to the element. As the element fills with water, the water will displace nitrogen back along the pipe 97A into the upper part of the sump. When the element is filled, the valves 80A are closed and the isolating valves 75A are opened thus bringing the element back into circuit.

The capacity of the sump 76 is such that it will receive all the water from the elements A to F and the water from the pipes 78 and those parts of the feeders 73 and 74 which are between the isolating valves 75 and the elements. The sump is therefore of adequate size for normal draining procedures. Occasionally, however, it is desired to drain the mains 68 and 69 and the pipes 71 and 72 and to accommodate this further water the second sump 89 is provided and the water is pumped from the sump 76 by the pumps 86 and through the filling valve 19 into the pipe 88 and the sump 89. The sump 76 is conveniently formed of concrete and is internally coated to prevent silica pick up by the water. By keeping the sides of the sump comparatively small, the danger of silica pick up can be minimised since there is less chance of the coating or lining breaking down than in a larger sump. The second sump 89 which is only occasionally used can be less expensively protected and can, for example, be of galvanised construction. The sump 89 can be common to a number of cooling towers if such cooling towers are arranged comparatively near to one another.

The mains 68 and 69 are drained into the sump by means of the pipe 94 and the drain valves 96. A float may be provided in the sump 76 so that when the water therein reaches a predetermined level, the pumps 86 are automatically started and the filling valve 90 opened to fill the sump 89. When it is required to drain the sump 89 back into the sump 76, the valve 91 is opened and, since the sump 89 is at a higher level than the sump 76, the water will drain into the sump 76 from whence it can be pumped back into the elements by the pumps 86.

It will be seen that the invention provides a dry cooling tower which is less sensitive to windy conditions than previously proposed dry cooling towers and in which, when it is desired to drain an element, the element is protected from corrosion by means of the nitrogen which flows in to fill the tubes of the element. These tubes can conveniently be made of carbon steel which would not be possible were no steps taken to prevent corrosion.

What is claimed is:
1. A natural draft cooling tower comprising, in combination:
    (a) a vertically extending tower means including external wall means defining a passage for upwardly directed air flow and further including peripherally extending first support means between the lower end of the tower wall and the ground so that said lower end is spaced above the ground,
    (b) a plurality of A-shaped heat exchanger elements located within said external walls covering a major portion of the horizontal area enclosed by said first support means, each element including
        (i) a plurality of A-frames formed of header tubes, each frame of said frames including header tubes which are mutually inclined with respect to a vertical plane to form an inverted V bisected by said vertical plane,
        (ii) the A-frames of each heat exchanger element being located at substantially the same level and being parallel to each other,
        (iii) a multiplicity of substantially horizontal finned tubes connected at each end to a header tube forming each said A-frame so as to receive fluid therefrom,
        (iv) means for supplying a fluid to be cooled to the interior of the header tubes, and
        (v) means for receiving cooled fluid from said header tubes; and
    (c) second support means disposed between said elements and the ground and supporting said elements above the ground; and
    (d) sealing means extending between the tower wall and the heat exchange elements, and between individual heat exchange elements for directing substantially all of the air entering the tower through said heat exchanger elements.

2. A cooling tower according to claim 1 wherein said second support means comprises a supporting framework of beams and wherein the adjacent lower edges of adjacent A-frames in each element are supported by and located above a beam of said framework.

3. The combination defined in claim 1 wherein said heat exchanger elements are arranged at two different levels and include a first group of heat exchanger elements arranged in the central region of the area enclosed by the tower and disposed at a first level, and a second group of heat exchanger elements arranged between such central region and the tower wall and disposed at a second level which is higher than said first level.

4. A cooling tower according to claim 3 wherein each A-frame carries a plurality of tubes arranged between opposed headers and wherein the elements of said second group are in the form of a square, the A-frames of the elements on two opposite sides of the square being parallel to the A-frames of the first group of elements, so that the headers at the inner ends of the A-frames on said two opposite sides overlap the headers at the ends of the first group of elements.

5. A cooling tower according to claim 4 including two elements in said first group and wherein the A-frames of said first group of elements are parallel to one another.

6. A cooling tower according to claim 5 wherein said sealing means include a platform extending between the inner ends of said A-frames of said first group of elements, an aperture in said platform of dimensions larger than the dimensions of the components forming said heat exchanger elements, and readily removable means for opening and closing said aperture.

7. A cooling tower according to claim 4 wherein said external wall means is of generally hyperbolic shape, and said sealing means include sealing plates of segment shape filling the space between the internal surface of the tower and the ends of the heat exchanger elements on the sides of said square.

8. A cooling tower according to claim 3 wherein said means for supplying a fluid comprises first conduit means extending between a relatively lower position on each element, and said tower further comprises a sump to receive liquid from the elements and having a relatively lower part connected to said first conduit means to permit passage of liquid between the element and the sump, first valve means in each of said first conduit means, and second conduit means extending between a relatively higher position on each element and a relatively higher part of the sump, the second conduit means and at least the upper part of the sump containing an inert gas, passage of liquid along the first conduit means from the sump or an element displacing inert gas along the second conduit means from the element or the sump to fill the space left in the sump or the element by the displaced liquid.

9. A cooling tower according to claim 8 wherein the sump is arranged at a level which is below the elements so that liquid can drain from each element into the sump by gravity and wherein pump means is provided to pass liquid from the sump to each element.

10. A cooling tower according to claim 8 including a source of inert gas connected to said relatively higher part of the sump through a pressure regulating valve to hold the pressure in said sump at a value above atmospheric.

11. A cooling tower according to claim 10 wherein the inert gas is nitrogen.

12. A cooling tower according to claim 8 including an inlet main and an outlet main connected to each element through third and fourth conduit means respectively, fifth conduit means connecting said mains to the sump, and isolating valves in said third, fourth and fifth conduit means.

13. A cooling tower according to claim 12 including a second sump connected to said first-mentioned sump, the first-mentioned sump being of a capacity to receive all the liquid from said first elements, said first conduit means and those parts of the third and fourth conduit means between the isolating valves and the elements but of a capacity insufficient to receive all the liquid from the elements, first, third and fourth conduit means and said mains, the second sump being dimensioned to receive the liquid which cannot be contained in the first-mentioned sump when said mains and the third and fourth conduit means are drained.

14. A cooling tower according to claim 13 wherein the first sump is made of concrete and lined to prevent or reduce silica pick up by the liquid.

15. A cooling tower according to claim 13 wherein the first-mentioned sump is located within said support means and the second sump is located outside the tower.

16. A cooling tower according to claim 8 including a ring main connected to all of said first conduit means between the first-mentioned sump and the valve means, the ring main being connected to said sump through second valve means and means for drawing the liquid from said sump and delivering it into the ring main through third valve means.

17. A method of erecting a natural draft cooling tower having an external wall which provides a passage for upwardly directed air flow and has its lower end supported above the ground by peripherally extending support means, comprising in the following order: erecting within the support means a supporting framework, erecting on the supporting framework header tubes; and subsequently interconnecting the header tubes by horizontally extending finned tubes by inserting the ends of the finned tubes into the header tubes and securing such ends to the header tubes.

References Cited

UNITED STATES PATENTS

| | | | |
|---|---|---|---|
| 3,384,165 | 5/1968 | Mathews | 165—122 |
| 2,891,773 | 6/1959 | Heller | 165—125 X |
| 2,907,554 | 10/1959 | Heller | 165—125 |
| 3,175,960 | 3/1965 | Kassat | 165—122 X |
| 3,400,917 | 9/1968 | Richards | 165—122 X |

ROBERT A. O'LEARY, Primary Examiner

T. W. STREULE, Assistant Examiner

U.S. Cl. X.R.

165—122; 261—29